Jan. 22, 1957 V. C. APPLEGATE ET AL 2,778,140
METHOD AND APPARATUS FOR CONTROLLING AQUATIC ANIMALS
Filed March 9, 1953 3 Sheets-Sheet 3
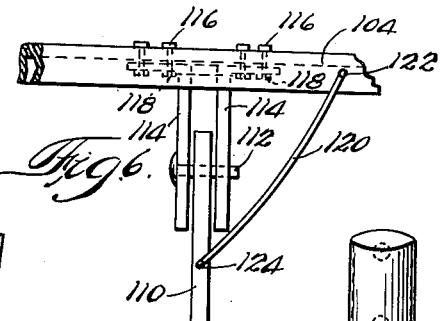
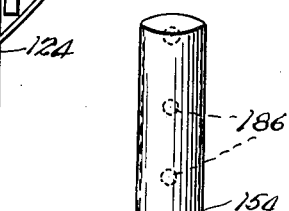
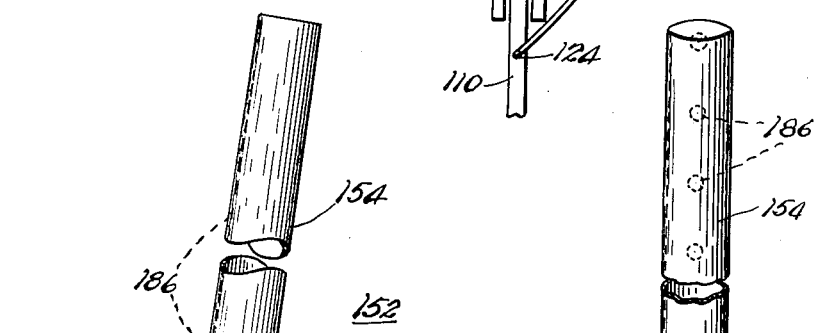
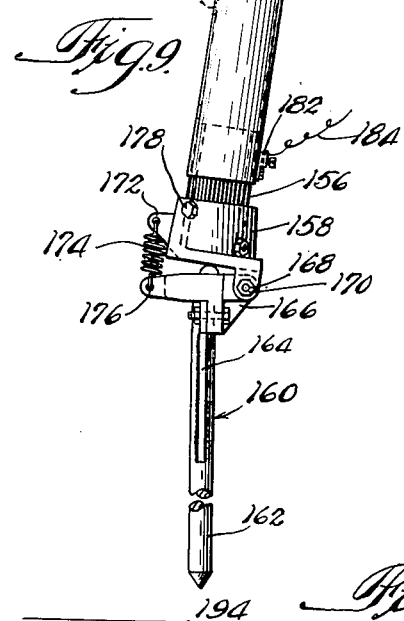
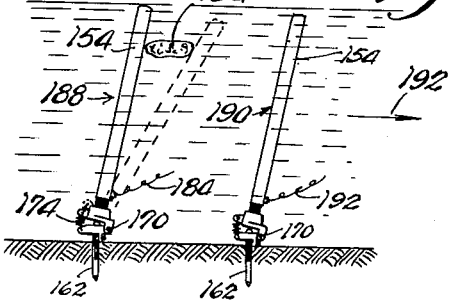
Inventors.
Vernon C. Applegate,
William L. Stahl,
& Bernard R. Smith.
By Thiess, Olson, Mechlenburger,
von Holst & Coltman. Attys.

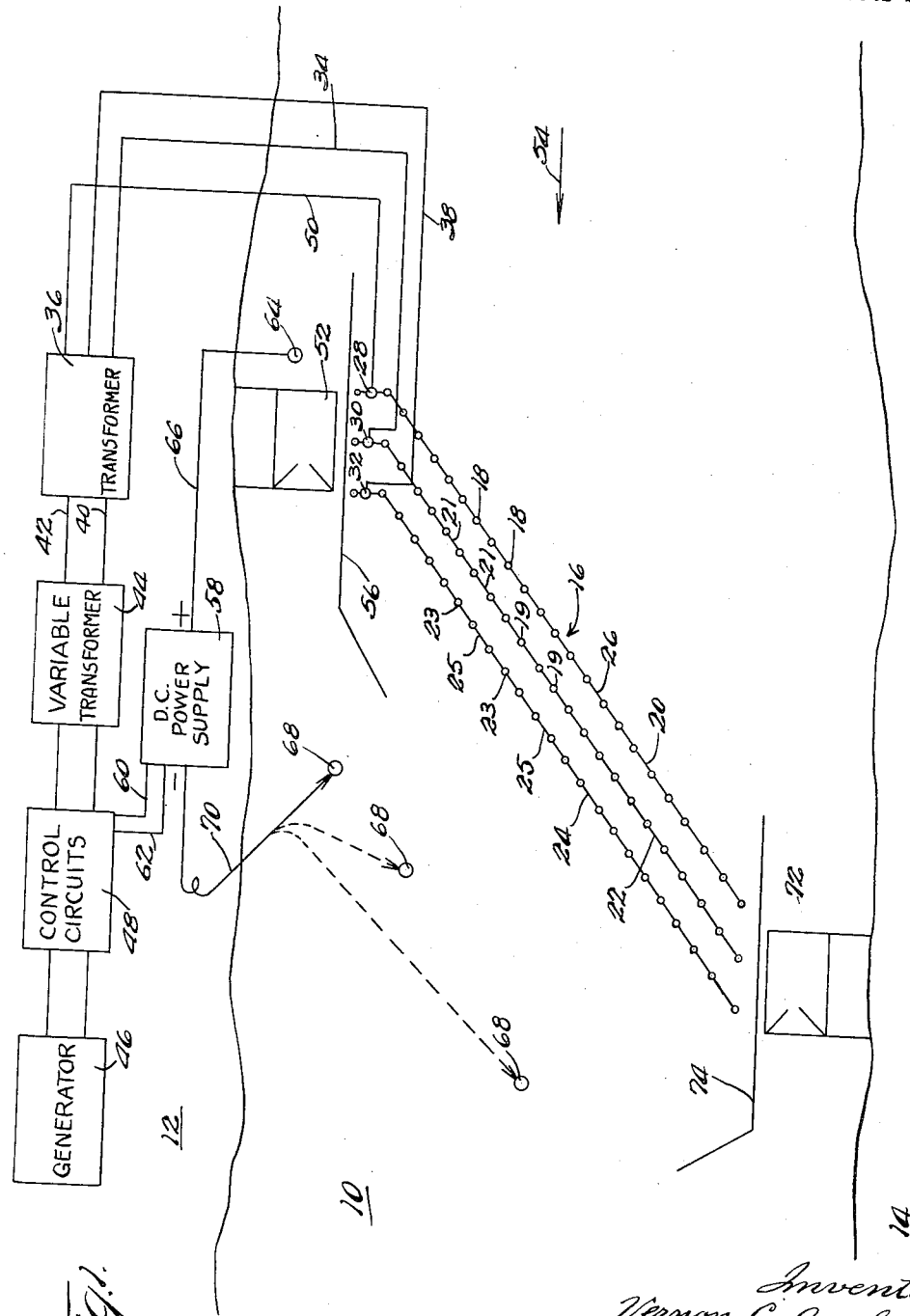

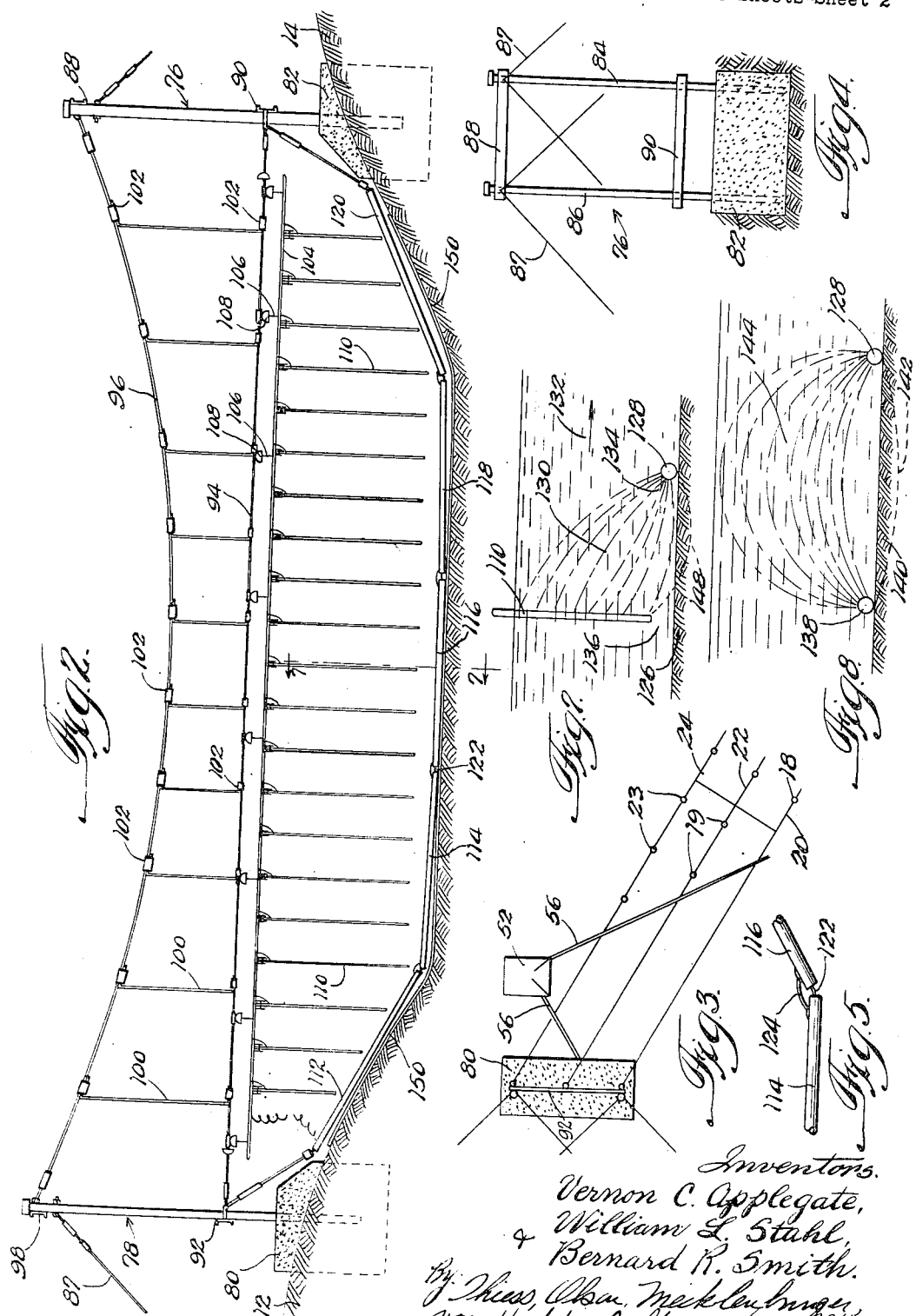

United States Patent Office 2,778,140
Patented Jan. 22, 1957

2,778,140

METHOD AND APPARATUS FOR CONTROLLING AQUATIC ANIMALS

Vernon C. Applegate, Rogers City, William L. Stahl, Ypsilanti, and Bernard R. Smith, Rogers City, Mich., assignors to the United States of America Application March 9, 1953, Serial No. 341,054

25 Claims. (Cl. 43—17.1)

This invention relates to an improved method and apparatus for controlling aquatic animals, and more particularly to electrical apparatus for controlling the migration and activity of selected aquatic animals and a method for aquatic animal control.

It is an important object of this invention to provide improved apparatus for selectively controlling the animal life in bodies of water.

It is often desirable to segregate various types of animal life existing in a body of water. It may be desired to select fish or other aquatic animals according to any one of a number of characteristics, such as length, species, and the like. Such a selection may be desired for identification purposes, either by species or size, or for selective capture or destruction of certain animal species. This latter purpose is especially desirable when the normal balance of nature has been upset because of certain man-made changes in the environment in such water bodies by which a particular animal species is favored to the obvious detriment of the remainder. Such a circumstance has arisen in the Great Lakes region as a result of the migration of the predatory sea lamprey from the Atlantic coastal regions. It is believed that this migration resulted from the construction of the Welland Canal by-passing Niagara Falls whereby the lamprey, once introduced into the Great Lakes region, have thrived and multiplied by feeding on game and food fishes in the Great Lakes which are not adapted to cope with this unforeseen enemy.

The sea lampreys, it has been found, have a normal life cycle which includes a spawning migration extending over a period of four months in the spring of each year, during which the lampreys seek the head waters of various lake tributaries. If the migration of the adult lamprey to these spawning areas or the migration of the young from their stream habitat is controlled, it is believed that ultimately the lamprey can be defeated and Great Lakes commercial fishing may be saved. In order to accomplish this, several types of mechanical traps, weirs, and barriers have been constructed on small lake tributaries, but these have been found to be costly, require continuous maintenance, and are not capable of withstanding the normal springtime floods of the streams. It was therefore considered desirable to provide a method and apparatus for controlling lamprey migration which would have relatively little detrimental effect upon normal migration and activity of food and game fishes but would be an effectual bar to lampreys in their spawning run.

It has been found that a relatively small voltage gradient in the body of an aquatic animal will produce various physiological effects. It is possible to electrocute a water animal by establishing a sufficiently large voltage gradient along the length of its body, but it is found more desirable to produce a smaller voltage gradient whereby certain traumatic effects are produced which will ultimately result in the animal's death. It has been found that in most fish-like verterbrates, an A. C. voltage gradient of the order of .5 volt per inch will cause paralysis through the tetanic contraction of the musculature of the animal. A D. C. voltage gradient of somewhat greater magnitude will produce electronarcosis in such animals. Such immobilization by electricity will cause paralysis of the gill structure and result in the animal's suffocation. It has further been found that a smaller voltage gradient existing in the water will cause certain aquatic animals, and especially game and food fishes having somewhat complex nervous systems, to be repelled from the energized area, particularly when alternating currents are utilized. A further useful effect, it has been discovered, is the galvanotactic attraction of certain food and game fishes to the anode or positive electrode of a direct current voltage source.

A D. C. field may be used in guiding fresh water food and game fishes which is either continuous in nature or periodically interrupted. It has been found that a periodic D. C. voltage is generally better for leading most game fishes, as a short period of recovery is provided between each energization period during which the galvanotactic response is produced. It has been found that the relationship between the off and on time of the direct current voltage may be varied but that a generally desirable ratio or duty cycle is approximately .66. That is, if the D. C. voltage is applied for approximately two-thirds of the time and is removed from the electrodes for aproximately one-third of the time, the best response is produced. Various repetition rates may also be utilized, but it is found generally that for response in most food and game fishes, a repetition rate of approximately three pulses per second is most desirable.

It has further been found that water animals such as the sea lamprey, which possess a rather primitive nervous system, are insensitive to small voltage gradients and consequently will proceed through a low gradient field and into an adjacent high gradient field until immobilization occurs.

Therefore, it is an additional object of this invention to provide a method and apparatus for segregating predetermined aquatic animal species.

It is a further object of this invention to provide a method and apparatus for destroying or controlling undesirable animals existing in a water body.

It is still another object of this invention to provide a safe, isolated, migratory path by which preselected animals may by-pass the electrical control structure.

It is another object of this invention to provide improved apparatus for the control of aquatic animals which may be readily adapted for use under varying conditions and in various locations.

It is a further object of this invention to provide an electrical apparatus for controlling aquatic life which will produce the minimum hazard to other wild life and to humans.

It is still another object of this invention to provide a method and apparatus for aquatic animal control requiring a minimum amount of equipment and entailing the least possible expense.

It is still another object of this invention to provide an improved method for the electrical control of aquatic life which may utilize either portable power sources or readily available commercial supplies.

It is another object of this invention to provide control apparatus which will not interfere with normal stream activity and which will pass floating objects such as normal stream debris without damage to the control apparatus.

It is another object of this invention to provide apparatus which will produce an incrementally varying field whereby various fishes may be selectively repelled and whereby preselected species of aquatic animals may be destroyed by a lethal field strength.

It is still another object of this invention to control the relative resistivity of a water body and the surrounding boundaries whereby an electric field may be established in the water body substantially independent of the character of surrounding materials.

Further and additional objects of this invention will be obvious from a consideration of this specification, the accompanying drawings, and the appended claims.

In one form of this invention an electrode structure is provided which extends obliquely from one bank of a stream to the other. This electrode structure is energized by a source of voltage whereby a voltage gradient of predetermined value is established in the water, said voltage gradient being of sufficient magnitude to repel preselected animal species and to produce immobilization in others.

More particularly, an oblique electrode structure is mounted to span such a stream over substantially all of its width, and a mechanical trap is provided at one point in the plane of the electrode structure and isolated from the effects of the electric field whereby preselected fish will be guided along the oblique electrode plane and into the trap structure. Thereafter the fish may be removed from the trap structure and placed back in the stream beyond the electrode array or may be disposed of in any desired manner.

An additional electrode structure may be provided whereby the mechanical trap is electrically isolated from the first-mentioned electrode array and whereby a direct current field may be established in the area which includes the mechanical trap. By energizing the last-mentioned electrodes from a direct current source and making the mechanical trap or an area adjacent thereto the positive electrode, game and food fishes will be attracted into the trap and will show no tendency to escape therefrom. Thus by providing an oblique electrode array energized with an A. C. voltage, food and game fishes will be repelled therefrom and led therealong while animals, such as the lamprey, having primitive nervous systems, will proceed into the A. C. field until immobilization results. The food and game fishes will be led safely along the boundary of the electrode array and will be attracted by the D. C. field whereby they will be safely led into the mechanical trap structure. To prevent excessive dissipation of energy in the stream bed, means may be provided to effectively isolate the water from the bed therebeneath.

For a more complete understanding of the invention reference should now be made to the accompanying drawings, wherein Figure 1 is a schematic plan view of an electrode installation in a transverse section of a stream;

Fig. 2 is an illustration in elevation of one mounting system for an electrode array;

Fig. 3 is a plan view of an alternate embodiment illustrating a second possible trap and shield structure;

Fig. 4 is a partial view in elevation showing the upright supports for the electrode array of Fig. 2;

Fig. 5 is a partial view of the longitudinal electrode structure of Fig. 2 showing the interconnection of adjacent electrode elements;

Fig. 6 illustrates the mounting of the vertical electrodes in the electrode array of Fig. 2;

Fig. 7 is a diagrammatic cross section taken along the line 7—7 of Fig. 2 and illustrating the field pattern of the electric current in the stream body;

Fig. 8 is a sectional view through a stream showing an alternate electrode structure to that of Fig. 7 wherein two horizontal electrodes are employed;

Fig. 9 illustrates in elevation one type of electrode structure adapted for mounting in the stream bed;

Fig. 10 is a front elevational view of the electrode of Fig. 9; and

Fig. 11 is a sectional view similar to Figs. 7 and 8 illustrating the mounting and operation of the bed-mounted electrode of Fig. 9.

Referring now to the drawings and more particularly to Fig. 1, a control apparatus in accordance with this invention is diagrammatically shown applied to a stream 10 having substantially parallel banks 12 and 14. An electrode array 16 extends obliquely across the greater portion of the span of the stream 10 and consists of a plurality of individual vertical electrodes 18 which are mounted in predetermined spaced relationship. Alternate electrode structures may be utilized and will be discussed below. The electrodes of this embodiment are mounted in three substantially parallel rows 20, 22, and 24 which extend obliquely across the stream 10 in substantially parallel relationship. The electrodes of any given row are interconnected electrically by conductors whereby an entire row may be energized from a single electrical terminal adjacent to one stream bank. As schematically shown in Fig. 1, the circles 18 represent vertical electrodes of the row 20 and are interconnected by conductor 26 which terminates in a binding post 28 at one bank of the stream. The electrodes 19 of row 22 are similarly interconnected by conductor 21 and terminate at binding post 30 and the electrodes 23 of row 24 are interconnected by conductors 25 which terminate at binding post 32. The terminal 30 which is associated with the central electrode row 22 is connected by conductor 34 to one output terminal of a center-tapped transformer 36. The downstream electrode row 24, which is connected to the terminal 32, has conductor 38 extending therefrom and is connected to the center-tap terminal of transformer 36. The transformer 36 also serves to isolate the electrode structure from ground. The precise voltage applied between the conductors 34 and 38 is determined by the number of turns in one-half of the secondary winding of the transformer 36 and the applied voltage, as is well understood, and is of a preselected value determined by the desired electrode spacing, the distance between the electrode rows 22 and 24, and the voltage gradient which is desired between said rows. The primary winding of the transformer 36 is energized from conductors 40 and 42, which are in turn energized from the output of a variable transformer 44. The variable transformer 44 may be included for experimentally arriving at desired voltages with a preset electrode arrangement, but in practical commercial installations this element may generally be omitted and any variations desired in gradient magnitude may be produced by varying the electrode and row positions. The variable transformer 44 is supplied from a generator 46 through various control circuits 48, such as fuses, switches, and the like. The precise control apparatus which is desired will be determined at each particular installation and may include timing motors to periodically energize the electrode array, circuit controls for over-voltage and over-current protection, and various auxiliary connections to energize collateral equipment such as lighting, heating, and the like which may be desired at the installation. These details of the control device are not illustrated or claimed and are not part of our invention.

The third row 20 of electrodes has conductor 50 connected thereto at the terminal 28. The conductor 50 is connected to the other output terminal of transformer 36 whereby electrode rows 20 and 22 are energized with the secondary voltage which may be of any predetermined value. In the particular installation here described, the transformer 36 has a 1:1 turns ratio and the voltage which is applied between electrode rows 22 and 24 taken between one terminal and the center-tap of transformer 36 is approximately half the value of the voltage applied between electrode rows 20 and 22. The purpose of this incremental voltage field will be clear from the description to follow. While the system herein disclosed produces an incremental field by using different applied voltages between various rows, the same end could be accomplished by energizing all of the rows with potentials of equal magnitude and producing an incrementally varying characteristic by varying the spacing of the rows or of the electrodes within a row.

The incremental electric field is established to insure rejection of game and food fish by providing a nonlethal voltage gradient between the downstream electrode rows 22 and 24 while providing a much greater voltage gradient of lethal character between the electrode rows 20 and 22. Thus food and game fish will normally be repelled by the relatively small increment of voltage between the outer electrode rows, while the sea lampreys, which are relatively insensitive to electric fields, will continue through the small voltage increment and into the gradient between the electrode rows 20 and 22, where the lethal gradient magnitude is maintained which will result in immobilization of the lamprey.

A mechanical trap 52 is provided along at least one bank of the stream substantially aligned with the electrode array 16. The object of the trap is to retain any water animals which avoid the electric field or which are led in their normal migration by the oblique mounting of the array. It is contemplated that the normal stream flow in the stream 10 will be in the direction shown by the arrow 54 and that the migratory activity of both the food and game fishes and the sea lamprey is in the upstream direction. Thus the oblique electrode mounting will cause the fish to be repelled by the electric field and will generally cause them to be led toward the trap 52. A conducting shield 56 is mounted between the trap 52 and the electrode array 16 to substantially isolate the trap 52 from any electrical effects of the apparatus. This shield screen 56 may be a wire mesh mounted upon a wooden or metal frame and secured in the stream bed or may be a plurality of vertical electrodes grounded by mounting in the stream bed.

A second control electrode structure is also shown in Fig. 1 and includes a direct current power supply 58 which is energized from the circuit control apparatus 48 through conductors 60 and 62 and has its output adapted to energize the stream area surrounding the mechanical trap 52 with a D. C. voltage gradient. A positive electrode or anode 64 is mounted in the upstream area above the trap 52 and is connected to the D. C. power supply by the conductor 66. One or more negative electrodes or cathodes 68 are mounted in the downstream area adjacent to the trap 52 and are energized by the D. C. power supply 58 through the conductor 70. As shown here in dotted lines, it is contemplated that the cathode 68 may be moved to a plurality of positions in order to produce the maximum guiding effect on the selected fishes responsive to a D. C. leading field. Adjacent to the stream bank 14 a second mechanical trap 72 and shield screen 74 are shown. These may be oriented as shown in Fig. 1, whereby additional migratory fish and chance sea lampreys which are traveling in the upstream direction will be collected, or the trap 72 may be reversed to entrap downstream migrating fish whereby they may safely bypass the electrical barrier. While the traps 52 and 72 and the shield screens 56 and 74 are here shown in a diagrammatic form, it is believed manifest that any desired type of trap or screen may be utilized.

While a D. C. field has here been described as existing between one or more cathodes 68 positioned in the downstream area and a single electrode 64 positioned upstream of the trap 52, it has been found that the trap 52, which will generally be of a metallic construction, may be utilized as the anode itself, thus eliminating the need for the electrode 64 and more positively insuring the desired leading in the food and game fish.

Tests have indicated that most game fish under field conditions respond well to a D. C. leading voltage. However, care must be exercised to properly select the magnitude of voltage, the repetition rate, and the duty cycle to prevent electronarcosis in the game fish. Tests have been performed on suckers, brook trout, rainbow trout, Northern pike, yellow perch, and black bullheads, and while they have been led to the anode in varying degrees, all have shown an unconscious, uncontrollable, stimulated movement toward the positive electrode. It has also been found that water temperature greatly affects the response of various fishes to an electrical stimulus. Therefore, while the general range of voltages for producing both galvanotactic response and electronarcosis have generally been established, because of lowered metabolism with lower temperatures, the voltage for the response would generally have to be increased when utilized in streams having a low water temperature.

In the event that migratory motion is anticipated in both the up and downstream directions at substantially the same time, it may be desirable to provide a fourth electrode row (not shown) in the array 16 upstream of the row 20 which would be energized from the output of the step-down transformer 36 to have a voltage gradient between the row 20 and the added row substantially less than the voltage gradient between the rows 20 and 22. Thus an incremental electric field will be established having a relatively high gradient in the central sector while both an upstream and downstream area will have a reduced, nonlethal gradient therein.

One possible electrode mounting structure is shown in Fig. 2. Therein a pair of superstructures 76 and 78 are positioned on opposite banks of the stream obliquely disposed from one another. They are preferably permanently mounted in concrete blocks 80 and 82 which are formed in the banks 12 and 14. As shown more clearly in Fig. 4, the superstructure 76 comprises two vertical supports 84 and 86 embedded in the concrete block 82 and a pair of transverse members 88 and 90 secured to the vertical supports 84 and 86 in substantially parallel spaced relationship. Guy wires 87 extend to various points removed from the superstructure as may be required. Any desired number of transverse cables spanning the stream may then be strung from the transverse support 90 to a corresponding transverse support 92 secured to the vertical support 78. To provide additional rigidity in the transverse cable 94 a catenary cable 96 is supported between the transverse member 88 of the vertical support 76 and a corresponding transverse member 98 mounted between the upper extremities of the vertical support 78. A plurality of cables 100 extend downwardly from the catenary cable 96 to engage the transverse cable 94 and are secured in place by appropriate clamps 102 whereby a relatively rigid suspension is provided. An electrode support and bus bar 104 is mounted beneath the transverse cable 94 and is secured in spaced relationship to and insulated from the cable 94 by a plurality of attaching links 106 having an insulating spacer 108 associated therewith. Vertical electrodes 110 extend downwardly from the bus bar 104 and are hingedly mounted thereto whereby they are free to rotate about the bus bar 104 only in the direction of stream flow. By securing a horizontal ground electrode 122 to the concrete bases 80 and 82, a simplified superstructure may be employed comprising a single vertical upright on each stream bank, as will be explained in greater detail below.

The vertical electrode mounting is more clearly shown in Fig. 6 wherein it can be seen that the vertical electrode 110 is pivotally mounted to the transverse bus bar 104 by passing a pin 112 through an aperture in the upper portion of the electrode 110 and through corresponding apertures in a bifurcated support 114. The support 114 is in turn secured to the bus bar 104 by a plurality of bolts 116 and cooperating nuts 118 or other appropriate attaching means. The bus bar 104, as here shown, is a U-shaped iron member, and a positive electrical connection is established between said bus bar and the electrode 110 by a flexible copper cable 120 secured to the bus bar 104 by screw 122 and secured to the vertical electrode 110 by the screw 124. This electrode mounting insures a substantially uniform positioning of the electrodes 110 transversely across the stream width but will allow rotation of the electrodes about their pivotal axis 112 whereby flotsam may freely pass thereunder by engagement with the electrode and consequent pivotal movement thereof. While the electrodes 110 are here shown positioned only in the central portion of the stream it should be clearly understood that the electrodes would continue substantially across the entire stream width in substantially spaced relationship as shown in Fig. 1.

As shown in Fig. 3, a plurality of electrode rows 20, 22, and 24 similar to that just described may be mounted in spaced relationship along the length of the transverse members 90 and 92. Only one transverse member 92 is shown in the portion of the structure shown in Fig. 3. It can be seen that any desired number of rows may be provided to produce any predetermined electric field pattern within the stream. The electrodes 18, 19, and 23 are shown diagrammatically in Fig. 3 extending downwardly from the transverse cables and positioned in spaced relationship up to the shield screen 56 which is associated with a mechanical trap 52. The structure and purpose of this screen and trap are believed clear from the discussion above. The field pattern between any two rows of vertical electrodes will have high gradient values immediately adjacent to the electrodes and have a minimum value in the central area between the rows. Each of the field lines between rows will be in a substantially horizontal plane curving to each electrode and spanning out to uniformly fill the central area between rows.

An electrode structure is illustrated in Fig. 2 which consists of a plurality of conducting hollow rods connected in end-to-end relationship. The rods 112, 114, 116, 118, and 120 are mechanically interconnected by cable 122 extending through the rods and attached to an electrically insulated supporting structure at each stream bank. The rods are additionally interconnected for more intimate electrical contact by a flexible conducting cable 124 which is secured to the adjacent terminals of the rods and has sufficient length to allow freedom for flexing of the cable 122. This interconnection of rods is most clearly shown in the expanded view of Fig. 5.

Fig. 7 diagrammatically illustrates the field pattern which would exist in a body of water electrified with an electrode structure comprising a horizontal electrode consisting of a plurality of rods horizontally aligned and a vertical electrode array spaced therefrom. The electrodes 110 of the vertical array extend from the water surface to within a few inches of the stream bed 126, and the horizontal electrode 128 lies near the stream bed and is displaced up or downstream from the vertical electrode array a predetermined distance. It has been found that the distance between the vertical electrodes 110 and horizontal electrode 128 may be varied, and the exact spacing of these two electrodes is determined by the velocity of water flow in the stream, the depth of the stream, and the conductivity of the water. The latter factor will vary substantially depending upon the turbidity of the stream and the conditions of the stream bed. It has generally been found that electrode row spacing in the range from four to twenty feet is most desirable. If the electrodes are energized from a 110-volt A. C. source and the rows are spaced five feet apart, it is clear that the over-all average of the voltage gradient between the two electrodes is approximately two volts per inch. However, because of the contact resistance at the interface between the electrode surface and the water, the shape of the electrodes, and the character of the fluid medium therebetween, the field is nonlinear and the voltage gradient varies substantially at various points between the electrodes. Thus the voltage gradient adjacent to the electrodes would be substantially greater than the two volts per inch average, while in the central area 130 between the two electrodes the voltage gradient will be approximately one volt per inch. This is the desirable minimum field strength to absolutely insure immobilization of all lampreys entering the barrier. The horizontal electrode 128 may be positioned either upstream or downstream from the vertical array. The choice of relative positioning of the two electrodes is determined by the function which the barrier is to serve. If the direction of stream flow is as indicated by the arrow 132, that is, the horizontal electrode 128 is upstream of the vertical array, lamprey upon entering the field will be immobilized in the central area 130 between the electrodes. The animals will then settle toward the stream bed and at the same time be carried downstream by the current in the direction of the arrow 132 and will thus enter the highly concentrated high gradient field area 134 close to the horizontal electrode 128. Thus the field gradient will increase to a value on the order of three volts per inch, which will absolutely insure suffocation of the animals. If, on the contrary, the electrode 128 is positioned upstream from the vertical array, that is, the electrodes are so positioned that the stream flow is oppsite to that shown by arrow 132, the fish will approach the field and be repelled while the lampreys will enter and be immobilized in the area between the electrode arrays and subsequently descend to the bottom and be carried out of the field pattern to a point beyond the vertical array in the area 136. Here they will either suffocate as a result of the tetany of the respiratory musculature which they have suffered because of the electrical exposure, or they will recover and once again enter the electric field because of their natural instinctive drive to the upstream spawning areas.

An alternate electrode array is illustrated in Fig. 8 wherein two longitudinal electrodes are placed along the stream bottom and a generally crescent-shaped field pattern is generated therebetween. Here the electrodes 128 and 138 are disposed approximately ten feet apart and produce an absolute barrier for both sea lampreys and migratory fish. This electrode structure is especially well adapted to a relatively shallow stream having a stream bed 140 which is of relatively low conductivity. As the longitudinal electrodes will generally lie on the stream bed, if the bed resistance is not approximately three times the resistance of the water thereabove a substantial amount of energy is dissipated by the current flowing in the stream bed. This is diagrammatically illustrated by the dotted line 142. In addition to dissipating an excess amount of energy in the stream bed, the field pattern resulting from a highly conductive bed is distorted and somewhat unpredictable. Thus voids might exist in the field pattern 144 in the stream above the bed through which aquatic animals might escape.

To a smaller degree this disadvantage is also present in the electrode structure illustrated in Fig. 7. If the stream bed 126 is highly conductive a current path illustrated by the dotted line 148 will substantially distort the field pattern between the vertical electrodes 110 and the longitudinal electrode 128 and will furthermore dissipate an excessive amount of energy. To overcome the disadvantage of a conductive stream bed it has been found that the stream bed may be advantageously lined with a nonconducting sheath 150, as illustrated in Fig. 2. This sheath may be any nonconducting water resistant material such as a tarcoated Kraft paper or the like. Such an expedient will often be necessary where the stream bed resistance is equal to or less than the resistance of the water flowing thereover.

An alternate method of mounting vertical electrodes is illustrated in Figs. 9, 10, and 11. The electrode herein provided is adapted for mounting at its base in the stream bed. The base mounting electrode structure 152 comprises generally a tubular elongated electrode 154 mounted on an insulating spacer 156 which is in turn secured in an electrode base 158. The base 158 is pivotally mounted on a staked support 160. The support 160 comprises a stake 162 and a wing-like ground anchor 164 whereby the stake may be driven into the stream bed and will be securely retained therein by the engagement of the anchor 164 in the bed. A bracket 166 is bolted to the anchor 164 and has a pivotal axis 168 along one edge thereof. The electrode base 158 has a corresponding apertured pivot through which a pin 170 is passed. Oppositely disposed from the pin 170 on the base 158 is an apertured lug 172 which retains a coil spring 174. The other end of the coil spring 174 is secured in a corresponding apertured lug 176 integrally formed with the bracket 166 and is so positioned that the spring 174 will be normally somewhat extended and will support the electrode 154 in a generally vertical position. The insulating spacer 156 is retained in the base 158 by bolts 178 and is generally cylindrical in cross section and having a diameter whereby the electrode 158 is freely positionable thereover and supported in spaced relationship thereto by the bolt and corresponding nut 180. An electrical terminal 182 is secured to the electrode whereby an appropriate conductor 184 may be retained in intimate electrical association with the tubular electrode. In this embodiment the electrode 154 has a plurality of apertures 186 disposed along its length whereby the tubular electrode will normally be filled with water and will thus be of a non-buoyant nature.

The manner of mounting these electrodes is shown in Fig. 11 wherein two adjacent rows of electrodes 188 and 190 are shown in spaced relationship along the stream length. The direction of flow in the stream would generally be in the direction of arrow 192 whereby any debris 194 such as that schematically shown in Fig. 11 will cause the elongated electrode 154 to rotate about its pivotal axis 170 and tension the coil spring 174, allowing the debris to pass over the upper end of the electrode. The pivotal axis 170 of the electrode structure will always be positioned substantially perpendicular to the direction of stream flow and at the downstream edge of the electrode. The conductor 184 which is associated with the electrodes 188 will interconnect each of the electrodes in the particular obliquely oriented row and will terminate at the power supply as described in Fig. 1. The conductor 192 which is associated with the row of electrodes 190 will interconnect each of the electrodes in that row and will also terminate at the power supply as described in Fig. 1, whereby a voltage gradient of predetermined magnitude will exist between the electrode rows 188 and 190 which are mounted in the stream bed in spaced relationship.

While several embodiments have herein been described in some detail, it is believed clear that in the light of the specification one skilled in the art will be able to utilize the teaching of this invention in various modified forms. As an example, it will be possible to utilize the combination of A. C. and D. C. voltages in a single control structure under varying conditions and in various physical configurations, but all of these are believed to be within the scope of this invention. However, this invention generally contemplates the novel use of an incremental field obliquely disposed in a stream for inducing aquatic animal leading. Furthermore various voltages and combinations of voltages may readily be determined which will produce desirable results under a variety of conditions, and all are believed to be within the spirit and scope of this invention.

Without further elaboration, the foregoing will so fully explain the character of our invention that others may, by applying current knowledge, readily adapt the same for use under varying conditions of service, while retaining certain features which may properly be said to constitute the essential items of novelty involved, which items are intended to be defined and secured to us by the following claims.

We claim:

1. A method of selectively controlling the movements of aquatic animals in a body of water comprising energizing a predetermined portion of said water body with an A. C. voltage gradient of predetermined non-lethal magnitude, said predetermined portion comprising a vertical planar sector extending substantially from the surface to the bottom of said water and substantially spanning said water body, energizing a second substantially vertical planar sector of said water body with an A. C. voltage gradient of lethal magnitude, said second planar sector being substantially parallel with and adjacent to said predetermined portion, and energizing the portion of said water body not spanned by said A. C. gradient sector with a D. C. voltage gradient of predetermined magnitude.

2. A method of selectively controlling the movements of aquatic animals in a body of water comprising energizing a predetermined vertical sector of such a body with an A. C. voltage to selectively reject certain aquatic animals, energizing an adjacent predetermined vertical sector of such a body with a D. C. voltage to selectively attract certain aquatic animals, and trapping such of said animals as may be selected.

3. In apparatus for selectively controlling the movements of aquatic animals in a body of water having opposed banks, electrode means positioned in such body of water to substantially span said body, an A. C. energy source connected to said electrode means to create an A. C. electric field of predetermined voltage gradient in such a body of water, control means positioned in said body of water adjacent to said electrode means, and a D. C. source connected to said control means to create a D. C. electric field adjacent to said A. C. field whereby an electric field completely spans said water body between such banks.

4. In apparatus for selectively controlling the movements of aquatic animals in a body of water having opposed banks, electrode means positioned in such body of water to substantially span said body, an A. C. energy source connected to said electrode means to create an A. C. field of predetermined voltage gradient in such a body of water, control means positioned in said body of water adjacent to said electrode means, a D. C. energy source connected to said control means to create a D. C. field adjacent to said A. C. field whereby an electric field completely spans said water body between such banks, and shield means to isolate the A. C. field and the D. C. field effects.

5. In apparatus for selectively controlling the movements of aquatic animals in a body of water having opposed banks, electrode means extending substantially from the surface to the bottom of said water body and positioned in such body of water to substantially span said body, an A. C. energy source connected to said electrode means to create an A. C. field of predetermined voltage gradient in such a body of water, second electrode means positioned in said body of water adjacent to said first electrode means, a D. C. energy source connected to said control means to create a D. C. field adjacent to said A. C. field whereby an electric field completely spans said water body between such banks, trap means positioned in the area of said D. C. field, and shield means to isolate the A. C. field and the D. C. field effects.

6. In apparatus for selectively controlling the movements of aquatic animals in a stream having generally parallel opposed banks, electrode means positioned in such stream and extending partially between such banks, an A. C. energy source connected to said electrode means to create an A. C. field of predetermined voltage gradient in such stream wherein the A. C. current flows generally parallel to such banks, control electrodes positioned in such stream adjacent to said electrode means, and a D. C. energy source connected to said control means to create a D. C. field adjacent to said A. C. field, at least one of said control electrodes being positioned with respect to one of said banks and said electrode means whereby the combined electric field completely spans said stream between said banks.

7. In apparatus for selectively controlling the movements of aquatic animals in a stream having generally parallel opposed banks, electrode means positioned in such stream and extending partially between such banks, an A. C. energy source connected to said electrode means to create an A. C. field of predetermined voltage gradient in such stream wherein the A. C. current flows generally parallel to such banks, control electrodes positioned in such stream adjacent to said electrode means, a D. C. energy source connected to said control means to create a D. C. field adjacent to said A. C. field, at least one of said control electrodes being positioned with respect to one of said banks and said electrode means whereby the combined electric field completely spans said stream between said banks, and trap means in said D. C. field for retaining therein certain selected aquatic animals.

8. In apparatus for selectively controlling the movements of aquatic animals in a stream having generally parallel opposed banks, electrode means positioned in such stream and extending partially between such banks, an A. C. energy source connected to said electrode means to create an A. C. field of predetermined voltage gradient in such stream wherein the A. C. current flows generally parallel to such banks, control electrodes positioned in such stream adjacent to said electrode means, a D. C. energy source connected to said control means to create a D. C. field adjacent to said A. C. field, at least one of said control electrodes being positioned with respect to one of said banks and said electrode means whereby the combined electric field completely spans said stream between said banks, conducting shield means to substantially isolate the A. C. and D. C. fields, and trap means in said D. C. field for retaining therein certain selected aquatic animals.

9. In apparatus for selectively controlling the movements of aquatic animals in a stream having generally parallel opposed banks, a first electrode means extending transversely in said stream, a second electrode means extending transversely in said stream in spaced relationship and substantially parallel to said first electrode means, an A. C. energy source having its output connected to said first and second electrode means to create an A. C. potential therebetween, control electrodes positioned in such stream adjacent said first and second electrode means, a D. C. energy source connected to said control means to create a D. C. field adjacent to said A. C. field whereby the combined electric field spans said stream between the banks, conducting shield means substantially isolating the A. C. and D. C. fields, and trap means in said D. C. field, at least one of said control electrodes being positioned with respect to one of said banks and said first and second electrode means for retaining therein certain selected aquatic animals.

10. In apparatus for selectively controlling the movements of aquatic animals in a stream having generally parallel opposed banks, a substantially waterproof, electrically resistant material positioned in a transverse section of the bed of such stream to substantially electrically isolate said stream bed sector from the water thereabove.

11. In apparatus for selectively controlling the movements of aquatic animals in a stream having a stream bed and opposed substantially parallel banks, three substantially planar electrode arrays mounted in substantially parallel spaced relationship and obliquely disposed with respect to such banks, each of said arrays comprising a plurality of electrically interconnected substantially vertically disposed electrodes spaced along said array and extending substantially from such stream bed to the stream surface, and energizing means connected to said arrays for producing a predetermined voltage gradient therebetween, the gradient between the first and second of said three arrays being substantially less than the gradient between the second and third of said arrays.

12. In apparatus for selectively controlling the movements of aquatic animals in a stream having a stream bed and opposed substantially parallel banks, three substantially planar electrode arrays mounted in substantially parallel spaced relationship and obliquely disposed with respect to such banks, each of said arrays comprising a plurality of electrically interconnected substantially vertically disposed electrodes spaced along said array and extending substantially from such stream bed to the stream surface, energizing means connected to said arrays for producing a predetermined voltage gradient therebetween, the gradient between the first and second of said three arrays being substantially less than the gradient between the second and third of said arrays, and trap means at one bank of said stream adjacent said arrays.

13. In apparatus for selectively controlling the movements of aquatic animals in a stream having a stream bed and opposed substantially parallel banks, three substantially planar electrode arrays mounted in substantially parallel spaced relationship and obliquely disposed with respect to such banks, each of said arrays comprising a plurality of electrically interconnected substantially vertically disposed electrodes spaced along said array and extending substantially from such stream bed to the stream surface, energizing means connected to said arrays for producing a predetermined voltage gradient therebetween, the gradient between the first and second of said three arrays being substantially less than the gradient between the second and third of said arrays, trap means at one bank of said stream adjacent said arrays, and electric shield means disposed between said trap and said arrays whereby said trap is isolated from the voltage gradient.

14. In apparatus for selectively controlling the movements of aquatic animals in a stream having a stream bed and opposed substantially parallel banks, three substantially planar electrode arrays mounted in substantially parallel spaced relationship and obliquely disposed with respect to such banks, each of said arrays comprising a plurality of electrically interconnected substantially vertically disposed electrodes spaced along said array and extending substantially from such stream bed to the stream surface, energizing means connected to said arrays for producing a predetermined voltage gradient therebetween, the gradient between the first and second of said three arrays being substantially less than the gradient between the second and third of said arrays, trap means at one bank of said stream adjacent said arrays, and director electrodes positioned in said stream on each side of said trap, said director electrodes being energized to attract aquatic animals into said trap.

15. In apparatus for selectively controlling the movements of aquatic animals in a stream having a stream bed and opposed substantially parallel banks, three substantially planar electrode arrays mounted in substantially parallel spaced relationship and obliquely disposed with respect to such banks, each of said arrays comprising a plurality of electrically interconnected substantially vertically disposed electrodes spaced along said array and extending substantially from such stream bed to the stream surface, A. C. energizing means connected to said arrays for producing a predetermined voltage gradient therebetween, the gradient between the first and second of said three arrays being substantially less than the gradient between the second and third of said arrays, trap means at one bank of said stream adjacent said arrays, grounded electric shield means disposed between said trap and said arrays whereby said trap is isolated from the voltage gradient, and director electrodes positioned in said stream on each side of said trap, said director electrodes being energized with a D. C. voltage to attract aquatic animals into said trap.

16. In apparatus for selectively controlling the movements of aquatic animals in a stream having a stream bed and opposed substantially parallel banks, three substantially planar electrode arrays mounted in substantially parallel spaced relationship and obliquely disposed with respect to such banks, each of said arrays comprising a plurality of electrically interconnected substantially vertically disposed electrodes spaced along said array and extending substantially from such stream bed to the stream surface, A. C. energizing means connected to said arrays for producing a predetermined voltage gradient therebetween, the gradient between the first and second of said three arrays being substantially less than the gradient between the second and third of said arrays, trap means at one bank of said stream adjacent said arrays, electric shield means disposed between said trap and said arrays whereby said trap is isolated from the voltage gradient, director electrodes positioned in said stream on each side of said trap, and D. C. energizing means connected to said director electrodes whereby selected aquatic animals will be attracted into said trap.

17. In apparatus for electrifying a fluid body with a predetermined voltage gradient, a base mounted electrode comprising a pointed base to be forced into the boundary of such a fluid body, an electrode support pivotally mounted on said base, resilient means disposed from the pivot of said support and adapted to maintain said support in a substantially vertical position, an insulating section inserted in said support, and an elongated electrode mounted on said insulating section and extending upwardly therefrom whereby said electrode is electrically isolated from said base.

18. In apparatus for electrifying a fluid body with a predetermined voltage gradient, a base mounted electrode comprising a pointed base to be forced into the boundary of such a fluid body, an electrode support having a transverse axis removed from the longitudinal axis of said pointed base and pivotally mounted to said base for rotation about said transverse axis, resilient means disposed from the pivot of said support and adapted to maintain said support in a substantially vertical position, an insulating section inserted in said support, and an elongated electrode mounted on said insulating section and extending upwardly therefrom whereby said electrode is electrically isolated from said base.

19. In apparatus for electrifying a fluid body with a predetermined voltage gradient, a base mounted electrode comprising a pointed base to be forced into the boundary of such a fluid body, an electrode support pivotally mounted on said base, an insulating section inserted in said support, and an elongated electrode mounted on said insulating section and extending upwardly therefrom, said electrode being a hollow sealed tube whereby the buoyancy of the water will maintain the electrode in a substantially vertical position.

20. In apparatus for selectively controlling the movements of aquatic animals in a stream having a stream bed and opposed substantially parallel banks, a pair of horizontal electrodes lying along the bed of such stream in substantially parallel spaced relationship and extending obliquely between the banks, and means for electrically energizing said electrodes whereby a voltage gradient is established in the water therebetween.

21. Apparatus for selectively controlling the movement of aquatic animals in a stream having generally parallel opposed banks, comprising trap means mounted in said stream, a first electrode means adjacent said trap means and extending therefrom transversely in said stream, a second electrode means extending transversely in said stream in spaced relationship and substantially parallel to said first electrode means, an A. C. energy source having its output connected to said first and second electrode means to create an A. C. voltage gradient of predetermined magnitude in the water therebetween.

22. Apparatus for selectively controlling the movement of aquatic animals in a stream having generally parallel opposed banks, comprising trap means mounted in said stream, a first electrode means adjacent said trap means and extending therefrom obliquely in said stream between the banks thereof, a second electrode means extending obliquely in said stream in spaced relationship and substantially parallel to said first electrode means, an A. C. energy source having its output connected to said first and second electrode means to create an A. C. voltage gradient of predetermined magnitude in the water therebetween, and shield means to substantially isolate said trap means from the A. C. voltage gradient.

23. Apparatus according to claim 22 in which the first electrode means comprises a plurality of spaced electrode elements supported in vertical coplanar relation.

24. Apparatus for selectively controlling the movement of aquatic animals in a stream having generally parallel opposed banks, comprising trap means mounted in said stream, a first electrode means adjacent said trap means and extending therefrom transversely in said stream, a second electrode means extending transversely in said stream in spaced relationship and substantially parallel to said first electrode means, an A. C. energy source having its output connected to said first and second electrode means to create an A. C. voltage gradient of predetermined magnitude in the water therebetween, shield means electrically isolating said trap means from said A. C. energy source, and insulating means in said stream beneath said first and second electrode means, whereby said voltage gradient is unaffected by the shunt path of the bed of said stream.

25. Apparatus for selectively controlling the movement of aquatic animals in a stream having a stream bed and opposed substantially parallel banks, comprising trap means in said stream adjacent one of said banks, an electrode array comprising a pair of horizontal electrodes in substantially parallel spaced relationship, said array mounted in said stream adjacent said trap means and extending therefrom obliquely between said banks, an A. C. energy source having its output connected to said pair of electrodes to create an A. C. voltage gradient of predetermined magnitude in the water therebetween, an electric shield means disposed between said trap and said array, second electrode means positioned in said stream above and below said trap, and a D. C. energy source connected to said second electrode means whereby selected aquatic animals will be attracted into said trap.

References Cited in the file of this patent

UNITED STATES PATENTS

| 1,515,547 | Burkey | Nov. 11, 1924 |
| 1,974,444 | Burkey | Sept. 25, 1934 |
| 2,233,045 | Bonner et al. | Feb. 24, 1941 |
| 2,426,037 | Mahoney et al. | Aug. 19, 1947 |

OTHER REFERENCES

"Use of Electricity in the Control of Sea Lampreys," Special Scientific Report: Fisheries No. 92. Published in 1952 by U. S. Department of the Interior.